United States Patent [19]
Lohberg et al.

[11] 3,736,464
[45] May 29, 1973

[54] CIRCUIT ARRANGEMENT FOR PRODUCING A HIGH VOLTAGE PULSE

[75] Inventors: Peter Lohberg, Rodheim V.D.H.; Hans Jürgen Katte, Herbert Blieske, both of Frankfurt/Main, all of Germany

[73] Assignee: Braun Aktiengesellschaft, Frankfurt am Main, Germany

[22] Filed: July 23, 1971

[21] Appl. No.: 165,056

[30] Foreign Application Priority Data

July 27, 1970 Germany............P 20 37 079.0

[52] U.S. Cl..........315/209 T, 315/209 CD, 315/226, 315/227 R, 315/239, 315/244
[51] Int. Cl. ......................................................H05b
[58] Field of Search.................315/36, 209 R, 209 T, 315/209 CD, 226, 227 R, 244, 239; 123/148 E; 331/112, 146

[56] References Cited

UNITED STATES PATENTS 3,056,066   9/1962   Dozier............................315/239 UX

*Primary Examiner*—Roy Lake
*Assistant Examiner*—James B. Mullins
*Attorney*—Ernest F. Marmorek

[57] ABSTRACT

A circuit arrangement for producing a high voltage pulse comprising a capacitor, a switching device having a first switching position and a second switching position, a source of power, the switching device in the first position thereof couples the capacitor with the source, a transducer having a primary winding and a secondary winding, the switching device in the second position thereof coupling the capacitor to the primary winding of the transducer and producing thereby a high voltage pulse in the secondary winding of the transducer, the power source comprising a semi-conductor blocking oscillator having a transistor therein with a collector, base and emitter electrodes, the collector and base electrodes of the transistor being coupled inductively with the transducer, the collector and base electrodes of the transistor device being coupled by means of the switching device in the first position thereof with one terminal of a d.c. source, the emitter electrode being coupled with the other terminal of the d.c. source, the inductances in the collector and base circuits of the transistor have a third inductance coupled thereto, a diode and a capacitor connected into a charging circuit for the capacitor, means including a further transducer means connected in a discharge circuit for the capacitor in another position of the switching device and a spark-gap connected across the discharge circuit.

1 Claim, 1 Drawing Figure

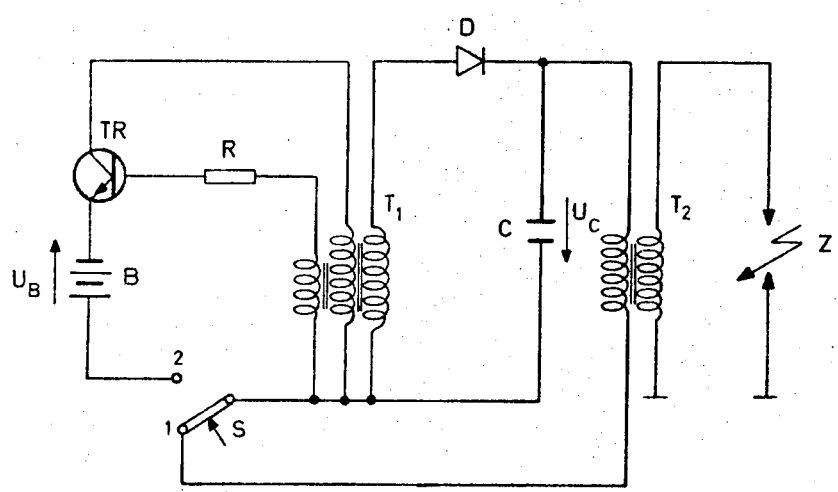

CIRCUIT ARRANGEMENT FOR PRODUCING A HIGH VOLTAGE PULSE

FIELD OF THE INVENTION

The present invention relates to a circuit arrangement for producing a high voltage pulse which can be used especially in lighter devices for producing the ignition spark therein.

BACKGROUND OF THE INVENTION

In the known circuit arrangements for producing a high voltage spark, a capacitor is connected by means of a switching device in the first switching position thereof with a voltage source and it becomes charged to the voltage of such source. In the second switching position of the switching device the capacitor is connected to the primary winding of a transducer and becomes discharged over such primary winding. The pulse generated in this process must undergo a high transformation by means of the secondary winding of the transducer where it should be taken off as the high voltage pulse. This requirement necessitates a high turn or transformer ratio which, in the known circuit arrangements, amounted to about 1 : 1,000 and, due to the large number of turns of the secondary winding, large dimensions were necessary for the entire circuit arrangement.

SUMMARY OF THE INVENTION

It is, therefore, an object of the present invention to provide a circuit arrangement for producing a high voltage pulse, such as a spark for use with a lighter arrangement, wherein the dimensions of the entire circuit are relatively small when compared to similar circuit arrangements of the prior art.

In accordance with the present invention the voltage source comprises a known transistorized blocking oscillator having an inductively coupled collector and base circuit, and the emitter electrode of which is returned to one of the terminals of a d.c. source and the collector-base circuits of which can be coupled by means of a switching device in the first position thereof with the other terminal of the d.c. source, and wherein the coupling inductance of the blocking oscillator is coupled with a further inductance the terminals of which are connected with the capacitor and a rectifier device into a discharge circuit.

BRIEF DESCRIPTION OF THE DRAWING

The invention will become more readily apparent from the following description of a preferred embodiment thereof shown, by way of example, in the accompanying drawing, in which:

The single FIGURE is a circuit diagram illustrating the high voltage spark producing circuit according to the present invention.

DESCRIPTION OF THE PREFERRED EMBODIMENT

With reference to the single FIGURE it is seen that in order to produce the required high voltage spark which necessitates a high transformation ratio, the transformation itself is divided into two transducer means. For the individual transducer the transducing relationship is reduced to the square root of the necessary transformation ratio which in the illustrated embodiment becomes about 1 : 32. Both transducers can be placed on a single core, as, for instance, in two separate chambers, and such dual transformer will receive still less turns than the single transformer of the heretofore known construction used to have. As a result, the device according to the present invention will have much smaller dimensions. More particularly, with reference to the single FIGURE it is seen that the transistor Tr, with its base resistor R, and the intercoupled inductances of the transducer $T_1$ are placed in the collector and the base circuit of the transistor Tr, which then together with the d.c. source B form a blocking oscillator. The third inductance of the transducer $T_1$, the rectifier device D and the capacitor C form the charging circuit for the capacitor C and the transducer $T_2$ together with the capacitor C form the discharge circuit.

In the event that the common point of the three intercoupled inductances of the transducer $T_1$ are connected by the switching device S through its second switching position 2 with the negative terminal of the d.c. source B, then the blocking oscillator starts to oscillate. On the inductance which is in the collector circuit of the transistor Tr, a pulse appears which becomes coupled to the inductance of the charging circuit and in accordance with the transformer ratio will charge the capacitor C over the diode D to a higher voltage than the battery or d.c. source voltage. After switching the switching means S into the indicated position 1, the capacitor C discharges over the primary winding of the transducer $T_2$ and produces a pulse which again in accordance with the transformer ratio of this transducer $T_2$ becomes stepped up by the secondary side thereof and produces there the high voltage spark across the sparkgap Z.

From the above, it is apparent that although the invention has been described hereinbefore with respect to a certain embodiment thereof, it is evident that many modifications and changes may be made without departing from the spirit of the invention. Accordingly, by the appended claims, we intend to cover all such modifications and changes as fall within the true spirit and scope of this invention.

Having thus described the invention, what we claim as new and desire to be secured by Letters Patent, is as follows:

1. A miniaturized spark producing circuit arrangement for the use in ignition means for gas lighters comprising in combination, a transducer including a low voltage direct current source, a transistorized inductive blocking oscillator having an output step-up winding for transforming the oscillating low voltage to a higher alternating voltage;

a loading capacitor;

rectifying means connected between said output step-up winding and said capacitor to charge the capacitor to a higher direct current voltage when said transducer is activated;

transformer means having a primary winding and a step-up secondary winding;

ignition spark-gap means connected across said secondary winding and switching means having a first switching position and a second switching position, said switching means in said first position activating said transducer and, in said second position, interrupting said transducer and connecting said primary winding to said capacitor, thereby inducing a high alternating voltage in said secondary circuit resulting in an ignition spark in said spark gap means.

* * * * *